/ United States Patent (12) United States Patent
Caldwell et al.

(10) Patent No.: US 10,493,856 B2
(45) Date of Patent: *Dec. 3, 2019

(54) SYSTEM, APPARATUS AND METHOD FOR OPTIMIZING WIRELESS CHARGING ALIGNMENT (71) Applicant: JABIL INC., St. Petersburg, FL (US)

(72) Inventors: Barry E. Caldwell, St. Petersburg, FL (US); Gustavo Armando Suarez, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,140

(22) Filed: May 25, 2018

(65) Prior Publication Data

US 2018/0312070 A1 Nov. 1, 2018

Related U.S. Application Data (63) Continuation of application No. 14/724,596, filed on May 28, 2015, now Pat. No. 10,005,368.

(51) Int. Cl.
B60L 11/18 (2006.01)
B60L 53/35 (2019.01)
(Continued)

(52) U.S. Cl.
CPC .......... B60L 11/1829 (2013.01); B60L 53/35 (2019.02); B60L 53/36 (2019.02); B60L 53/38 (2019.02);
(Continued)

(58) Field of Classification Search
CPC ............ H02J 5/005; H02J 7/025; B60L 53/35
(Continued)

(56) References Cited

U.S. PATENT DOCUMENTS 8,305,036 B2 * 11/2012 Toya ...................... H02J 7/025
320/108
9,637,014 B2 * 5/2017 Schneider ............... H02J 7/025
2015/0094887 A1 4/2015 Kawashima

FOREIGN PATENT DOCUMENTS

EP 2793359 A1 10/2014

OTHER PUBLICATIONS

International Search Report and Written Opinion, dated Sep. 19, 2016 for PCT/US2016/0034583.
(Continued)

Primary Examiner — Richard V Muralidar
(74) Attorney, Agent, or Firm — Thomas J. McWilliams; Barnes & Thornburg LLP (57) ABSTRACT An apparatus, system and method for wireless power transfer, where a wireless power signal is provided from a charger to a device. A moving mechanism coupled to one of the charger and the device, may move one of the charger and the device along a predetermined pattern along at least one of three axes while wireless power is provided. Wireless power characteristic data may be received from a plurality of locations. The wireless power characteristic data from at least some of the plurality of points are processed to determine at least one of a threshold and optimum wireless power characteristic data value. The moving mechanism may move the one of the device and the charger to a location within the predetermined pattern based on the processed wireless power characteristic data.

17 Claims, 5 Drawing Sheets (51) Int. Cl.
 B60L 53/38 (2019.01)
 B60L 53/39 (2019.01)
 B60L 53/36 (2019.01)

(52) U.S. Cl.
 CPC .......... B60L 53/39 (2019.02); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/14* (2013.01); *Y02T 90/16* (2013.01)

(58) Field of Classification Search
 USPC ........................................................ 320/108
 See application file for complete search history.

(56) References Cited

OTHER PUBLICATIONS

International Preliminary Report on Patentability, dated Dec. 7, 2017 for PCT/US2016/034583.

\* cited by examiner

SYSTEM, APPARATUS AND METHOD FOR OPTIMIZING WIRELESS CHARGING ALIGNMENT

FIELD OF THE DISCLOSURE

The present disclosure relates to optimizing wireless charging. More specifically, the present disclosure relates to detecting optimal wireless charging positions between transmitters and receivers and physically adjusting them relative to each other to achieve improved wireless charge transfer.

BACKGROUND

Wireless power transfer (WPT) or wireless energy transmission is the transmission of electrical power from a power source to a receiving device without using solid wires or conductors. Generally, the term refers to a number of different power transmission technologies that use time-varying electromagnetic fields. In wireless power transfer, a transmitter device is connected to a power source, such as the mains power line, and transmits power by electromagnetic fields across an intervening space to one or more receiver devices, where it is converted back to electric power and utilized. Wireless power techniques may fall into two categories, non-radiative and radiative.

In near-field or non-radiative techniques, power may be transferred over short distances by magnetic fields using inductive coupling between coils of wire by electric fields using capacitive coupling between electrodes, for example. Using these techniques, it may be possible to transfer power wirelessly within two meters distance with an efficiency of 70% at a frequency of 100 kHz. Applications of this type include, but are not limited to, cell phone, tablets, laptops, electric toothbrush chargers, RFID tags, smartcards, and chargers for implantable medical devices like artificial cardiac pacemakers, and inductive powering or charging of electric vehicles like cars, trains or buses. In radiative or far-field techniques, sometimes called "power beaming", power may be transmitted by beams of electromagnetic radiation, like microwave or laser beams. These techniques can transport energy longer distances but are typically aimed at the receiver.

Numerous standardized technologies have been developed over the years, including, but not limited to, Alliance for Wireless Power ("A4WP") which is based on an interface standard ("Rezence") for wireless electrical power transfer based on the principles of magnetic resonance, where a single power transmitter unit (PTU) is capable of charging one or more power receiver units (PRUs). The interface standard supports power transfer up to 50 Watts, at distances up to five centimeters. The power transmission frequency may be 6.78 MHz, and up to eight devices can be powered from a single PTU depending on transmitter and receiver geometry and power levels. A Bluetooth Smart link may be provided in an A4WP system for controlling power levels, identification of valid loads, and protection of non-compliant devices.

Another standardized WPT technology includes "Qi" which relies on electromagnetic induction between planar coils. A Qi system may include a base station, which is connected to a power source and provides inductive power, and a device that consumes inductive power. The base station may include a power transmitter having a transmitting coil that generates an oscillating magnetic field; the device may include a power receiver holding a receiving coil. The magnetic field from the transmitter may induce an alternating current in the receiving coil by Faraday's law of induction. A further standardized WPT technology includes "Powermat" adopted by the Power Matters Alliance (PMA), which is based upon inductively coupled power transfer, where a transmitter may vary current in a primary induction coil to generate an alternating magnetic field from within a charging spot. The receiver in the consuming device may have its own induction coil that takes power from the magnetic field and converts it back into electrical current to charge the device battery. An additional part of the technology is the use of system control communication via Data over Coil (DoC), where the receiver may send feedback to the transmitter by changing the load seen by the transmitter coil. The protocol is frequency based signaling, thus enabling fast response of the transmitter.

In WPT systems, it is often necessary to place a consuming device, having a receiver antenna, within the general area and range of a WPT transmitter in order to receive power. While adequate power may be provided when the consuming device is physically placed in the general area and range of the WPT transmitter, the placement may not be optimal, which may result in less-than optimal power transfer. In cases where the receiving entity is of a larger size (e.g., car, truck, train, etc.) this problem may be compounded. Accordingly, technologies are needed to optimize wireless charging alignment between a WPT transmitter and one or more receivers.

SUMMARY

Accordingly, under some illustrative embodiments, a wireless power transfer system is disclosed that includes a device, configured to receive wireless power; a charger, configured to provide wireless power to the device; and a moving mechanism, operatively coupled to one of the device and the charger, the moving mechanism being configured to move one of the charger and the device along a predetermined pattern when the charger is providing wireless power to the device, the moving mechanism further being configured to (i) receive wireless power characteristic data when the one of the device and the charger is being moved and (ii) move the one of the device and the charger to a location within the predetermined pattern based on the wireless power characteristic data.

In other illustrative embodiments, a method for wireless power transfer is disclosed that includes the steps of providing a wireless power signal from a charger to a device; moving, via a moving mechanism coupled to one of the charger and the device, one of the charger and the device along a predetermined pattern when wireless power is provided; receiving wireless power characteristic data when the one of the device and the charger is being moved by the moving mechanism; and moving, via the moving mechanism, the one of the device and the charger to a location within the predetermined pattern based on the wireless power characteristic data.

In further illustrative embodiments, a method for wireless power transfer is disclosed that includes the steps of providing a wireless power signal from a charger to a device; moving, via a moving mechanism coupled to one of the charger and the device, one of the charger and the device along a predetermined pattern along at least one of three axes while wireless power is provided; receiving wireless power characteristic data from a plurality of locations in the pattern while wireless power is provided; processing the wireless power characteristic data from at least some of the plurality of points to determine at least one of a (i) threshold and (ii) optimum wireless power characteristic data value; and moving, via the moving mechanism, the one of the device and the charger to a location within the predetermined pattern based on the processed wireless power characteristic data.

BRIEF DESCRIPTION OF THE FIGURES

The present disclosure will become more fully understood from the detailed description given herein below and the accompanying drawings which are given by way of illustration only, and which thus do not limit the present disclosure, and wherein.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Figure 1:
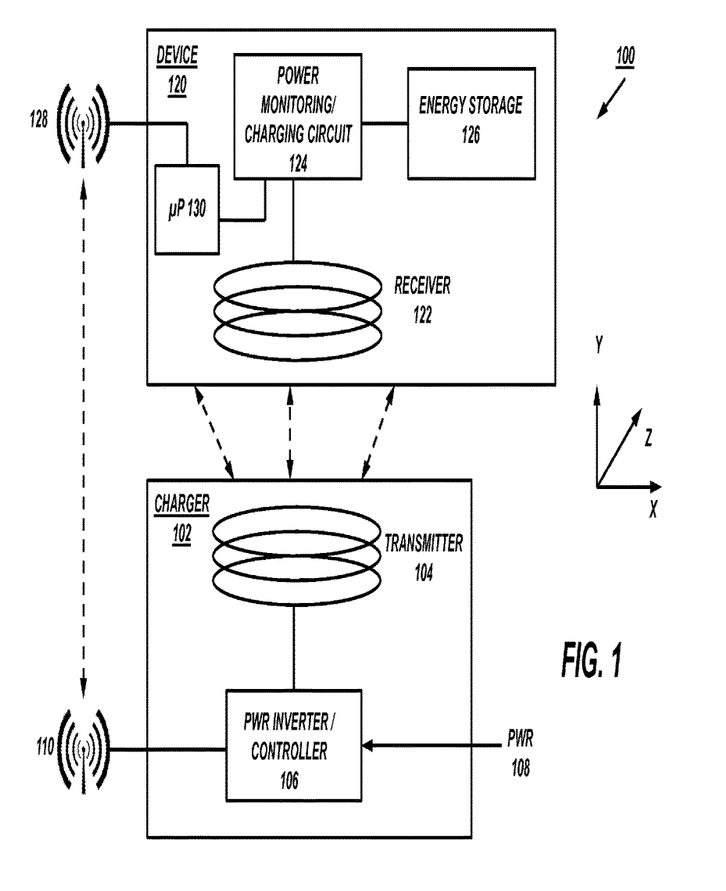
FIG. 1 shows a WPT system comprising a charger and a device configured to receive wireless power transmission under an illustrative embodiment.

Turning now to FIG. 1, a WPT system 100 is shown under an illustrative embodiment, including a charger 102 and a device 120 comprising an energy storage apparatus, such as battery 126. In one non-limiting example, device 120 may be an electronic device, such as a smart phone, table, laptop, medical device, power tool, and the like. In another non-limiting example, device 120 may be a car, bus, train, etc. It should be understood by those skilled in the art that device 120 may be any device capable of being configured to receive WPT signals to power device 120 and/or recharge an energy storage apparatus (e.g., 126).

In the example of FIG. 1, charger 102 may include a power inverter/controller 106 (hereafter "controller") that receives power from power source 108. Power source 108 may be mains power or any other suitable power source. Controller 106 may include, but is not limited to, power inverter circuitry, amplifier circuitry, oscillator circuitry, filter circuitry, impedance-matching circuitry, power control circuitry, processor circuitry, controllers and the like for generating and controlling power for transmission via transmitter 104 to receiver 122, which may be configured as coils, plates, magnetic armatures, and the like.

In some illustrative embodiments, transmitter 104 and receiver 122 may include a single coil configured to provide magnetic resonance and/or magnetic induction charging. In some illustrative embodiments, transmission coil 104 and receiver may include a plurality of coils that may be configured in an overlapping and/or non-overlapping arrangement to provide magnetic resonance or magnetic induction charging. In some illustrative embodiments, transmitter 104 and receiver 122 may include electrodes, such as a plates, configured to transmit and couple power via electrostatic induction. In some illustrative embodiments, transmitter 104 and receiver 122 may transmit and couple power using magnetodynamic coupling using rotating armatures, which rotate synchronously, coupled together by a magnetic field generated by magnets on the armatures.

In some illustrative embodiments, controller 106 may include communications circuitry to allow controller 106 to communicate in a wired or wireless manner (e.g., WiFi, Bluetooth, infrared, etc.) with device 120. Communications circuitry of controller 106 may include a wireless antenna 110 for communicating data with wireless antenna 128 of device 120. Communicated data may include power feedback data from device 120, where the power feedback data may include data relating to power transfer efficiency, link efficiency, quality factor(s), and the like. Power feedback data may be provided through an RF power transfer link using a sub-carrier communication band suitable for packet-based communication.

In some illustrative embodiments, device 120 may include power monitoring and charging circuitry 124 that may be coupled to a processor 130 and energy storage 126, which may operate as a load in some illustrative embodiments. Power monitoring and charging circuitry 124 may include, but is not limited to, RF circuitry, rectifier circuitry, impedance matching circuitry, which may be configured to form an impedance matching network with controller 106, filter circuitry, communication circuitry for communicating via wireless antenna 128 and charging circuitry for providing power to energy storage 126. Power monitoring and charging circuitry 124 may also be coupled to processor 130 that may be configured to store and execute algorithms for measuring and/or calculating characteristics of the power being received (e.g., power transfer efficiency, link efficiency, quality factor(s), etc.) and provide it as feedback via wireless antenna 128 or other suitable means.

In an illustrative embodiment, device 120 may be placed within proximity of charger 102 in order to receive WPT signals in receiver 122, which is processed/converted in power monitoring and charging circuit 124 and provided to energy storage 126 for subsequent use. While not explicitly shown in FIG. 1, energy storage 126 may be coupled to other electronics within device 120 in one embodiment to provide operative power. During transfer of WPT, it may be advantageous that the transmitter 104 and receiver 122 be physically aligned along the x, y, and/or z axis to ensure that excessive signal loss is not introduced as a result of misalignment in any of the axes, which in turn may materially affect power signal transfer and efficiency.

Figure 1A:
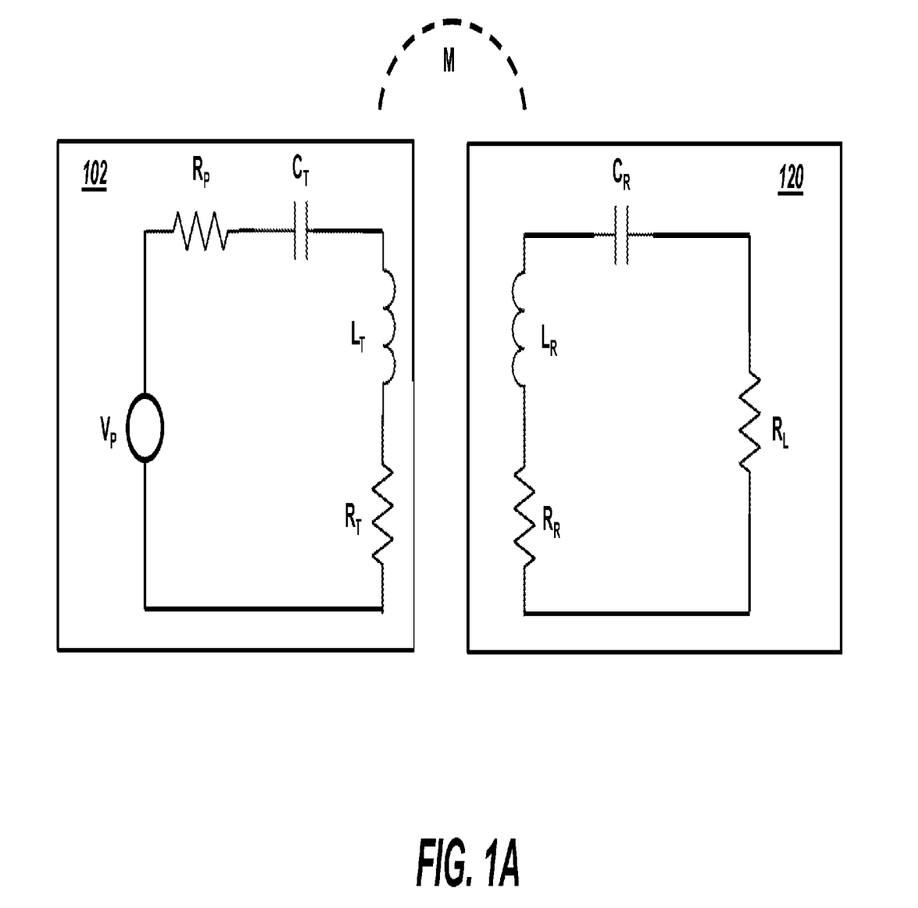
FIG. 1A shows an equivalent circuit of the WPT circuit portions of the system of FIG. 1 under an illustrative embodiment.

Turning to FIG. 1A, an equivalent circuit is shown using portions of the WPT system 100 of FIG. 1, where, in this non-limiting example, the transmitter 104 and receiver 122 are configured as resonating WPT circuits. Transmitter 102 may include a voltage source with amplitude $V_p$ at frequency $\omega$ and having power source resistance $R_p$. The voltage source may be coupled to a transmitter resonator circuit that may include capacitor $C_T$, inductor $L_T$ and resistor $R_T$. Energy may oscillate at a resonant frequency between inductor $L_T$ (representing energy stored in the magnetic field) and capacitor $C_T$ (representing energy stored in the electric field) and may be dissipated in resistor $R_T$. The resonator circuit of transmitter 102 may be coupled through mutual inductance (M) to inductor $L_R$ of receiver 120, which may similarly resonate using circuit $C_R$ and $R_R$ to provide power to load $R_L$.

Generally speaking, a resonator (e.g., 104, 122) may be described by multiple parameters, including, but not limited to, its resonant frequency $\omega$ and its intrinsic loss rate $\Gamma$. The ratio of these parameters may be used to determine a quality factor, or Q of the resonator, where $Q=\omega/2\Gamma$ to measure how well a resonator stores energy. The resonant frequency and quality factor for the transmitter and receiver (T, R) resonators may be expressed as $$\omega_{(T,R)} = \frac{1}{\sqrt{L_{(T,R)} C_{(T,R)}}}, \text{ and}$$

$$Q = \frac{\omega_{(T,R)}}{2\Gamma} = \sqrt{\frac{L_{(T,R)}}{C_{(T,R)}}} \frac{1}{R_{(T,R)}} = \frac{\omega_{(T,R)} L_{(T,R)}}{R_{(T,R)}}$$

From FIG. 1A, the transmitter (e.g., 104) and receiver (e.g., 122) coils may be represented by inductors $L_T$ and $L_R$, respectively, that may be coupled through mutual inductance M, where $M=k\sqrt{L_T L_R}$, where k is a coupling coefficient or energy coupling rate. each coil may have a series capacitor ($C_T$, $C_R$) to form a resonator. Resistances $R_T$ and $R_R$ may be considered parasitic resistances that include both ohmic and radiative losses of the respective coil and resonant capacitor. The load, which may be energy storage 126 is represented in this example by $R_L$.

Power delivered to the load (e.g., $R_L$) may be determined by dividing the maximum power available from the transmitter when both the transmitter and receiver are resonant at $\omega$, or $$\frac{P}{P_{T,max}} = \frac{4 \cdot U^2 \frac{R_P}{R_T} \frac{R_L}{R_R}}{\left( \left(1 + \frac{R_P}{R_T}\right)\left(1 + \frac{R_L}{R_R}\right) + U^2 \right)^2}$$

where U may be considered the performance metric ("figure of merit") for the system and may be expressed as $$U = \frac{\omega M}{\sqrt{R_T R_R}} = \frac{k}{\sqrt{\Gamma_T \Gamma_R}} = k\sqrt{Q_T Q_R} \ .$$

Impedance matching (e.g., using an impedance transformation network) may be used with coupled mode theory to match resistances as closely as practicable to improve initial efficiency (e.g., $R_T/R_R = \sqrt{1+U^2}$), where the efficiency of the power transmission may be maximized according to $$\eta_{opt} = \frac{U^2}{\left(1 + \sqrt{1+U^2}\right)^2}$$

where higher-efficiency energy transfer may be achieved with higher values of U. Efficiency may also be based on energy loss rates within a receiver ($\Gamma_R$), and/or may be based on a magnetic coupling coefficient (k) between the resonators and the resonator quality factors for the transmitter and receiver ($Q_T$, $Q_R$) as follows:

$$U = \frac{\omega M}{\sqrt{R_T R_R}} = k\sqrt{Q_T Q_R}$$

By using the resonator quality factors and the range of metric coupling between the transmitter and receiver for a specific application, the efficiency of a WPT could readily be determined.

Figure 2A:
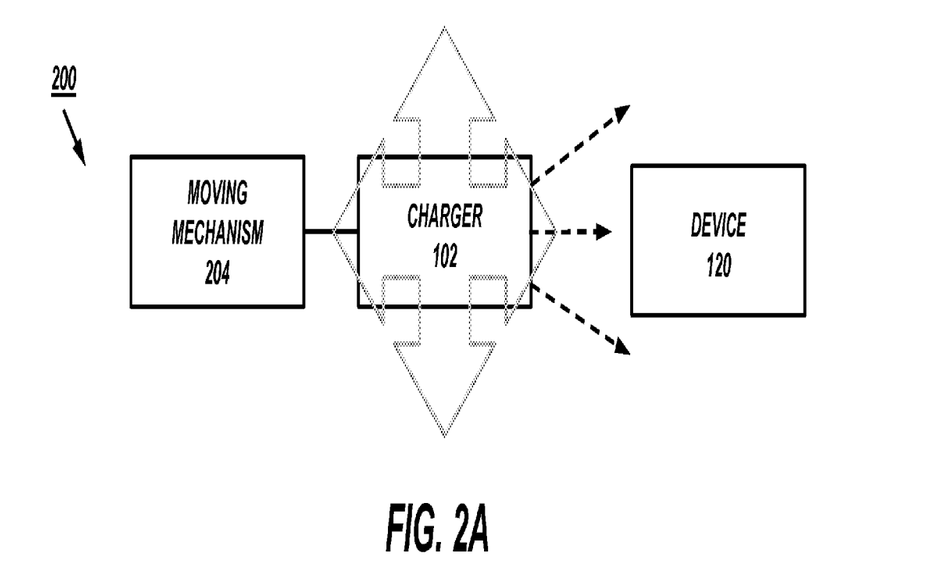
FIG. 2A shows the charger and the device of FIG. 1 and an adjusting mechanism configured to physically adjust the charger relative to the device before charging.
Figure 2B:
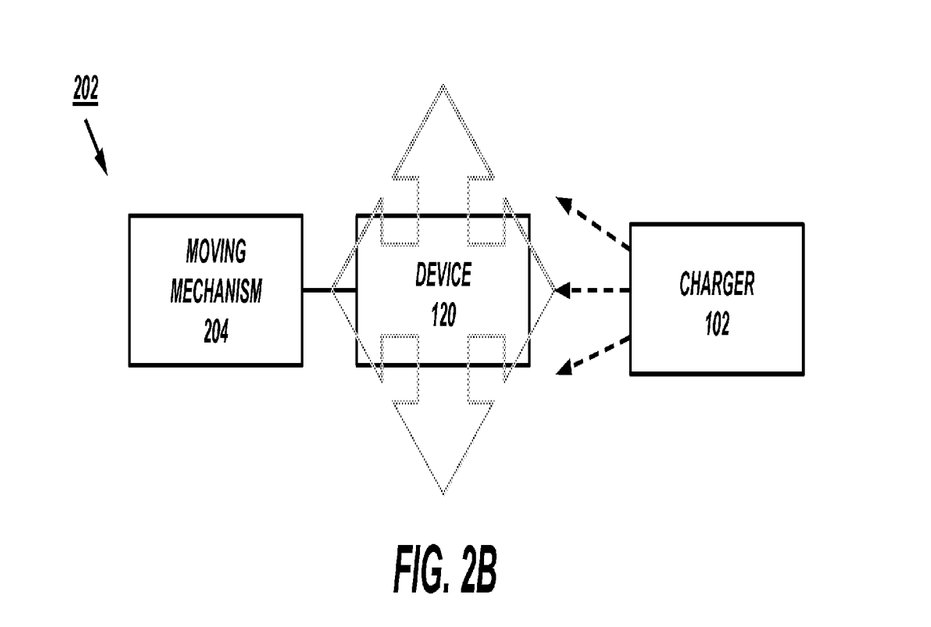
FIG. 2B shows the charger and the device of FIG. 1 and an adjusting mechanism configured to physically adjust the device relative to the charger before charging.

Turning to FIGS. 2A and 2B, various illustrative embodiments are shown for utilizing a moving mechanism 204 for physically moving charger 102 or device 120. As discussed above, there may be instances where charger 102 and/or device 120 are not optimally aligned relative to each other in the x, y and/or z axes. Due to the misalignment, the power transfer efficiency may be negatively affected. In some cases, the power transfer efficiency may be substantially affected. Moving mechanism 204 is configured to align and/or re-align transmitters/receivers to achieve an optimal charging position.

In an illustrative embodiment, charging system 200 of FIG. 2A may include moving mechanism 204 coupled to charger 102, wherein moving mechanism 204 may be configured to move charger 102 anywhere along an x-y planar area. In some illustrative embodiments, mechanism 204 may be configured to also move charger 102 along the z plane (e.g., closer and further distances from device 120). The specific moving arrangement of moving mechanism 204 may vary, depending on the charging application. In one illustrative embodiment, moving mechanism 204 may include a receiving area (e.g., dock, cradle, platform, etc.) to receive charger 102, where motors and/or actuators are configured to move charger 102 laterally, longitudinally and/or vertically relative to device 120. The motors and/or actuators may be controlled by one or more processors and/or microcontrollers, along with wired and/or wireless communication circuitry (not shown) that communicate with charger 102.

In another illustrative embodiment, moving mechanism 204 may be at least a part of a mechanical/electromechanical arm or extension that is configured to extend under device 120 to an initial charging position, wherein the moving mechanism 204 may control movement of the arm via motors and/or actuators to reposition charger 102 with device 120. It should be understood by those skilled in the art that various moving mechanism 204 configurations are contemplated in the present disclosure, and that the aforementioned moving mechanism 204 configurations are not limited to those expressly disclosed. For example, various roller or bearing-based moving mechanisms may be used instead or, or in addition to, the aforementioned embodiments.

As will be explained in greater detail below, moving mechanism 204 may be configured to receive wireless power characteristic data (e.g., power transfer efficiency, energy transfer rate, energy loss rate, etc.) from charger 102 that includes information regarding one or more qualities of the wireless power transfer. Based on the charging characteristic data, moving mechanism 204 may continue receiving and processing wireless power characteristic data and physically move charger 102 along any of the x, y, z axes until an improved and/or optimal characteristic is determined. In one simplified embodiment, moving mechanism 204 may be configured to move moving mechanism 204 only in the z-axis direction. As WPT coupling typically degrades as the distance from charger 102 and device 120 increases, charger 102 may be physically moved via moving mechanism 204 along a z-axis towards device 120 until an optimal wireless power characteristic (e.g., power transfer efficiency, energy transfer rate, energy loss rate, etc.) is detected. Alternately or in addition, charger 102 may be physically moved via moving mechanism 204 along a z-axis towards device 120 until an over-coupling condition is detected.

Under an illustrative embodiment, in use, charger 102 may be first activated to provide WPT energy to device 120 as shown. Once WPT energy is transmitted, device 120 may communicate wireless power characteristics (e.g., using antennas 128, 110) back to charger 102, which in turn may process and/or transmit the wireless power characteristic data to moving mechanism 204. Using one or more processors, moving mechanism 204 may determine if the wireless power characteristic data is above or below one or more predetermined wireless power characteristic thresholds or ranges, and in turn determine if the wireless charging is within an acceptable or optimal value or range. Under an illustrative embodiment, moving mechanism 204 may be configured to automatically move charger 102 along a predetermined pattern (e.g., linear, spiral, circumferential, zigzag, etc.) within an area and/or periphery of device 120. During movement, charger 102 may continuously or periodically obtain wireless power characteristic data from device 120.

Figure 3A:
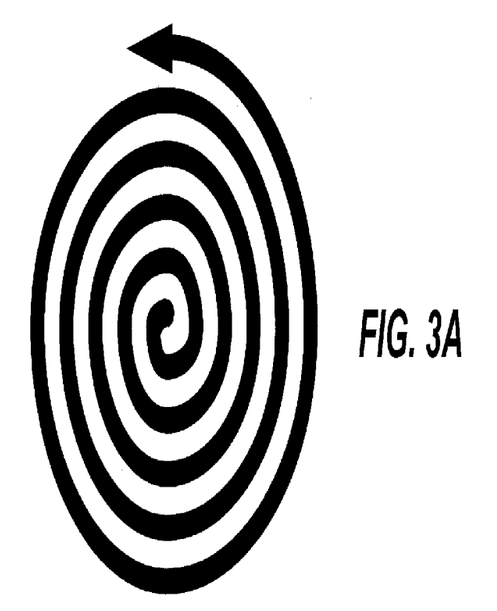
FIGS. 3A-3B show various adjustment patterns utilized by the adjusting mechanism for optimizing wireless power transfer efficiency under illustrative embodiments.
Figure 3B:
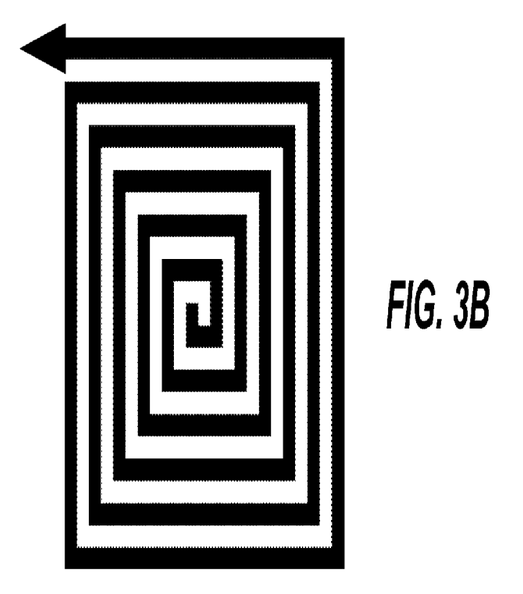

In an illustrative embodiment, moving mechanism 204 may move charger 102 along a predetermined pattern until the entire movement pattern is completed. FIGS. 3A and 3B illustrate non-limiting examples of spiral patterns used by moving mechanism 204 to move charger 102. It should be understood by those skilled in the art that any suitable pattern may be used to cover at least a portion of the wireless charging area. By measuring wireless power characteristic data continuously or periodically throughout the pattern, moving mechanism 204 may determine an optimal wireless power characteristic, such as highest power transfer efficiency, highest energy transfer rate, lowest energy loss rate, etc. for positioning charger 102 to charge device 120 for continued wireless power transfer. In an illustrative embodiment, moving mechanism 204 may move charger 102 along a predetermined pattern, and stop the movement once a wireless power characteristic meets or exceeds a threshold.

In an illustrative embodiment, moving mechanism 204 may begin movement of charger 102 once the device 120 is in position for charging and WPT signals are transmitted to device 120. The simultaneous charging and movement/ measurement, may be referred to as a "optimization charge" phase or state, as the charging characteristics may fluctuate during the movement of charger 102. Such a configuration may be advantageous in expediting the charging process, since the alignment of charger 102 occurs simultaneously with the charging process. In some embodiments however, there may be instances where power may need to be conserved. In such a case, a lower WPT power level may be used by charger 102 during an optimization charge to determine wireless power characteristics. Upon detection of an acceptable or optimal power transfer location, moving mechanism 204 may signal charger 102 to begin charging at full power.

Turning to FIG. 2B, a system 202 is disclosed where moving mechanism 204 controls movement of device 120 relative to charger 102. System 202 is substantially equivalent to system 200 of FIG. 2A, except that device 120 is being moved instead of charger 102. Such a configuration may be advantageous in configurations where charger 102 may be a larger-sized apparatus that is not readily movable.

In either of the embodiments of FIG. 2A and 2B, the charger 102 or device 120 may be integrated with moving mechanism 204 as a single unit.

Figure 4:
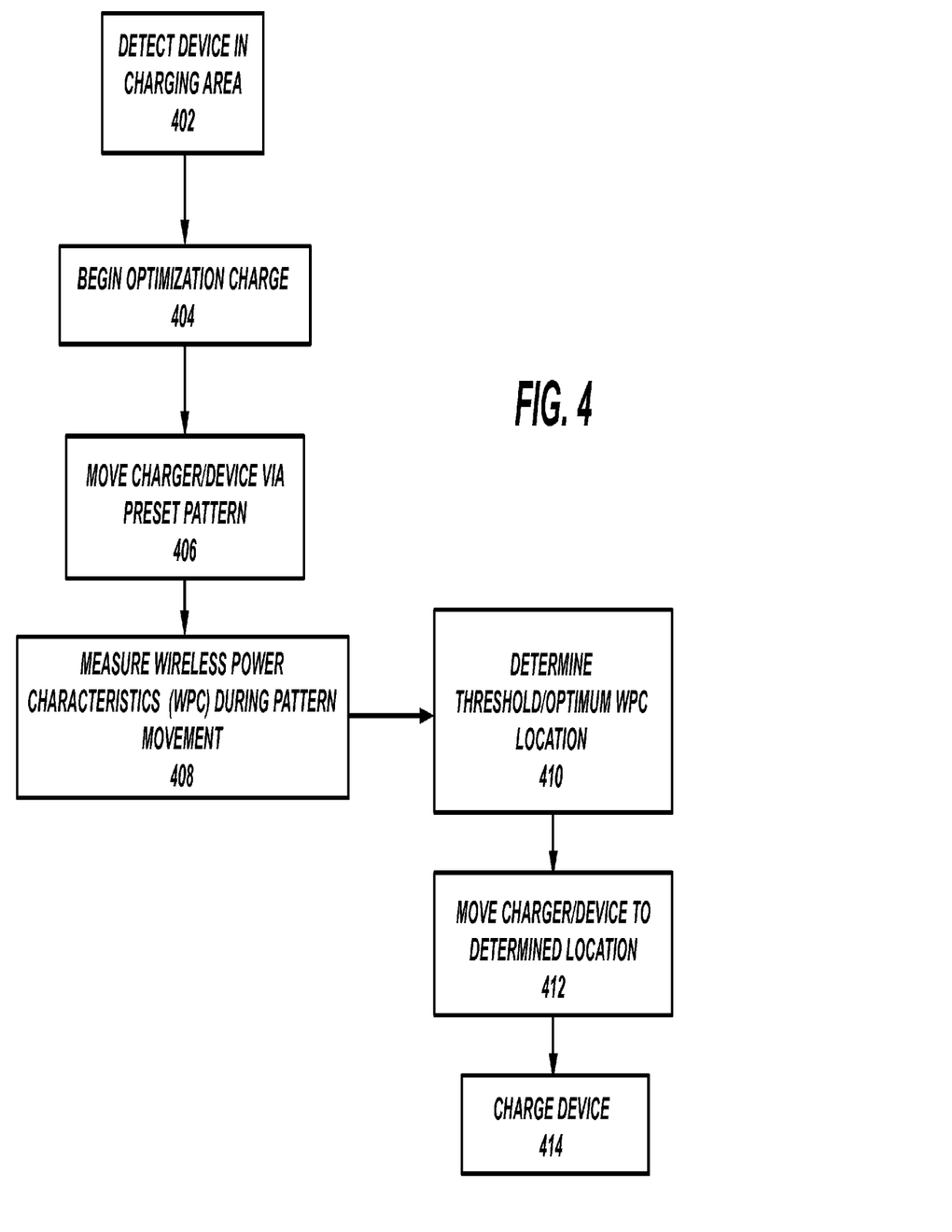
FIG. 4 shows a method for adjusting the charger or device relative to each other for optimizing wireless power transfer efficiency under an illustrative embodiment.

Turning now to FIG. 4, an illustrative embodiment is shown for a method for aligning and charging. In block 402, a charger (e.g., charger 102) may detect if a device that is to be charged is within a charging area. In block 404, charger 102 activates to provide WPT power to begin an optimization charge. In block 406, moving mechanism 204 begins to move charger 102 (see embodiment of FIG. 2A) or device 120 (see embodiment of FIG. 2B) along a preset pattern (e.g., FIGS. 3A-3B). While the moving mechanism 204 moves charger 102 or device 120 along the pattern, wireless power characteristics, such as energy transfer efficiencies, are measured in block 408.

During and/or after the charger 102 or device 120 has completed traversing the predetermined pattern, the system determines one or more points within the pattern in which an acceptable characteristic (e.g., meeting/exceeding a minimum threshold) and/or optimal characteristic (e.g., the best measurement) was determined in block 410. In some illustrative embodiments the characteristics may be combined, e.g., determining the best measurement only from those exceeding a minimum threshold. In block 412, moving mechanism 204 moves the charger 102 or device 120 to the point or location where the acceptable/optimal characteristic was determined, where WPT signals are used to charge device 120 in block 414. In cases where a plurality of acceptable/optimal measurements are detected, moving mechanism 204 may select the optimal charging location that is nearest the current location of moving mechanism 204 when optimization charging is completed.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. A wireless power transfer system, comprising:
   a device, configured to receive wireless power;
   a charger, configured to provide wireless power to the device; and
   a moving mechanism, operatively coupled to one of the device and the charger, the moving mechanism being configured to provide unbounded movement to one of the charger and the device along a first predetermined pattern in three axes selected from a plurality of at least three available predetermined patterns when the charger is providing wireless power to the device, wherein test points along the first predetermined pattern vary based on which is the selected one of the first predetermined pattern, the moving mechanism further being configured to:
   (i) receive wireless power characteristic data when the one of the device and the charger is being moved;
   (ii) move the one of the device and the charger to an optimal charging location within the first predetermined pattern based on the wireless power characteristic data; and,
   (iii) if no optimal charging location is located within the first predetermined pattern, providing unbounded movement to one of the charger and the device along a second predetermined pattern different from the first predetermined pattern in three axes when the charger is providing wireless power to the device;
   (iv) again receive the wireless power characteristic data when the one of the device and the charger is being moved through the second predetermined pattern; and
   (v) move the one of the device and the charger to an optimal charging location within the second predetermined pattern.

2. The wireless power transfer system of claim 1, wherein the wireless power characteristic data comprises at least one of power transfer efficiency, energy transfer rate, and energy loss rate.

3. The wireless power transfer system of claim 1, wherein the device and the charger are configured to communicate wireless power characteristics using wireless data communication.

4. The wireless power transfer system of claim 1, wherein the moving mechanism is configured to move the one of the device and the charger to a location within the predetermined pattern based on the wireless power characteristic data meeting or exceeding a predetermined threshold.

5. The wireless power transfer system of claim 1, wherein the moving mechanism is configured to move the one of the device and the charger to a location within the predetermined pattern based on the wireless power characteristic data being an optimal value.

6. The wireless power transfer system of claim 1, wherein the moving mechanism comprises at least one of motors and actuators configured to move the one of the device and the charger along at least one of the x, y and z directions.

7. A method for wireless power transfer, comprising:
   providing a wireless power signal from a charger to a device;
   moving, in an unbounded manner, along three axes, and via a moving mechanism coupled to one of the charger and the device, one of the charger and the device along a first predetermined pattern when wireless power is provided, wherein test points differ based on the selected one of the first predetermined pattern;
   receiving wireless power characteristic data when the one of the device and the charger is being moved by the moving mechanism;
   moving, via the moving mechanism, the one of the device and the charger to an optimal charging location within the first predetermined pattern based on the wireless power characteristic data;
   if no optimal charging location is located within the first predetermined pattern, moving in an unbounded manner one of the charger and the device along a second predetermined pattern different from the first predetermined pattern in three axes when the charger is providing wireless power to the device;
   receiving the wireless power characteristic data when the one of the device and the charger is being moved through the second predetermined pattern; and
   moving the one of the device and the charger to an optimal charging location within the second predetermined pattern.

8. The method of claim 7, wherein the wireless power characteristic data comprises at least one of power transfer efficiency, energy transfer rate, and energy loss rate.

9. The method of claim 7, further comprising communicating wireless power characteristics using wireless data communication.

10. The method of claim 7, further comprising moving, via the moving mechanism, the one of the device and the charger to a location within the predetermined pattern based on the wireless power characteristic data meeting or exceeding a predetermined threshold.

11. The method of claim 7, further comprising moving, via the moving mechanism, the one of the device and the charger to a location within the predetermined pattern based on the wireless power characteristic data being an optimal value.

12. The method of claim 7, wherein moving one of the charger and the device comprises moving one of the charger and the device using at least one of motors and actuators in the moving mechanism along at least one of the three axes.

13. A method for wireless power transfer, comprising:
providing a wireless power signal from a charger to a device;
moving, in an unbounded manner and via a moving mechanism coupled to one of the charger and the device, one of the charger and the device along a first plurality of points which comprise a first predetermined pattern along at least one of three axes while wireless power is provided;
receiving wireless power characteristic data at the plurality of points in the first predetermined pattern while wireless power is provided;
processing the wireless power characteristic data from at least some of the plurality of points in the first predetermined pattern to determine at least one of a (i) threshold and (ii) optimum wireless power characteristic data value;
moving, via the moving mechanism, the one of the device and the charger to a location within the predetermined pattern based on locating an optimal charging location among the processed plurality of points according to the processed wireless power characteristic data;
if no optimal charging location is located, moving, in an unbounded manner and via the moving mechanism coupled to one of the charger and the device, one of the charger and the device along a second plurality of points which comprise a second predetermined pattern along at least one of three axes while wireless power is provided, wherein the second plurality of points are varied from the first plurality of points; and
moving, via the moving mechanism, the one of the device and the charger to a location within the second predetermined pattern based on locating an optimal charging location among the second plurality of points.

14. The method of claim 13, wherein the wireless power characteristic data comprises at least one of power transfer efficiency, energy transfer rate, and energy loss rate.

15. The method of claim 13, further comprising communicating wireless power characteristics using wireless data communication.

16. The method of claim 13, wherein moving one of the charger and the device comprises moving one of the charger and the device using at least one of motors and actuators in the moving mechanism along at least one of the three axes.

17. The method of claim 13, wherein the device comprises one of an electronic device, a car, a bus, and a train.

* * * * *